June 29, 1965  P. B. FONDEN ETAL  3,191,891
STORAGE MEANS FOR AIRCRAFT-ARRESTING NETS
Filed Jan. 28, 1964

INVENTORS:-
P.B. FONDEN &
K.O.T. WÅLANDER
BY
ATTORNEY.

United States Patent Office 3,191,891
Patented June 29, 1965

3,191,891
STORAGE MEANS FOR AIRCRAFT-
ARRESTING NETS
Per Borje Fondén, Hejdegatan 3, and Karl Ove Torgny
Wålander, Elsa Brandström Gata 5, both of Linkoping,
Sweden
Filed Jan. 28, 1964, Ser. No. 340,631
Claims priority, application Sweden, Mar. 16, 1963,
2,886/63
6 Claims. (Cl. 244—110)

The present invention relates to an arrangement for storing in a trench, collapsed ropes, cables, rods, nets or the like forming part of for example, erectable and collapsible nets or arresting devices for aircraft.

The invention is characterized principally by it being possible by the means disclosed, to close the top of the trench by the employment of one or more covers which can be rotated to and from the top opening of the trench and around centers of rotation located below the opening.

It is an object of the invention to provide a storage means for aircraft-arresting nets in which a trench located below the net is provided with a plurality of successive, pivotal covers or closure members which extend for the length of the trench and close the top of the trench and protect the net when housed therein. The invention contemplates the provision of latch means for holding the covers in their closed position and means by which the latches will be released to allow the covers to be swung to open position as the net is raised to intercept an approaching aircraft.

With this and other objects to be hereinafter set forth in view, we have devised the arrangement of parts to be described and more particularly pointed out in the claims appended hereto.

Figure 2:
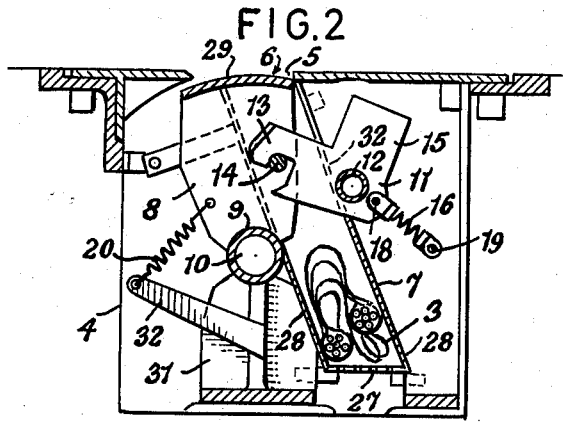
Figure 3:
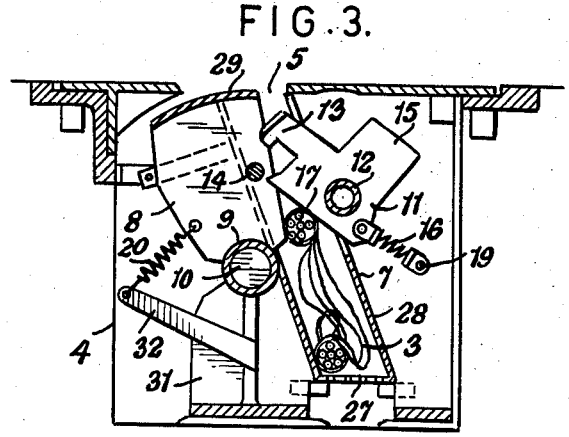
Figure 4:
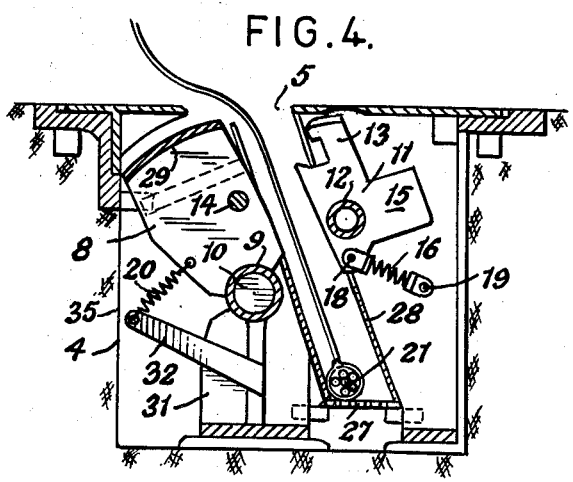
Figure 1:
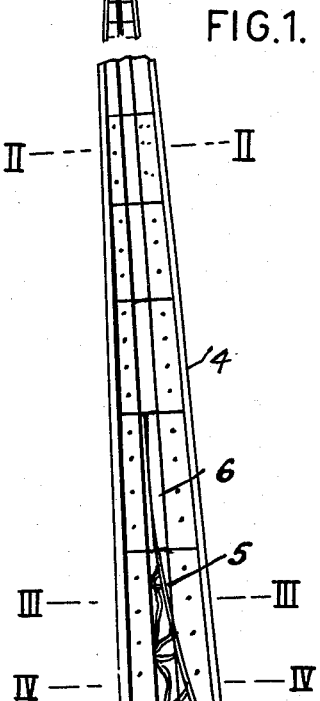

In the accompanying drawings, wherein an illustrative embodiment of the invention is disclosed, FIG. 1 is a perspective view of an arresting device for aircraft as seen obliquely and from above;

FIG. 2 is a sectional view, taken substantially on the line II—II of FIG. 1, and FIGS. 3 and 4 are sectional views, taken respectively on the lines III—III and IV—IV of FIG. 1.

In FIG. 1 of the drawing is shown an arresting device which includes a net 3 extending across the runway and suspended between the masts 1 and 2. When the masts are raised, the net is lifted to an erect position and when the masts are lowered, the net will be collapsed and can be stored in the manner to be described. Located below the net when the net is in its erected position, is a trench 4, opening at the top as shown at 3, and which opening can be closed by a number of pivoted covers or closure members 6 arranged in sequence along the length of the trench to thereby completely close the top opening 3 for the length of the trench.

Arranged within the trench is a container 7, provided with a bottom wall 27 and side walls 28, the container being adapted to receive the collapsed net 3 as clearly seen in FG. 2. The covers 6 are provided with radial arms 8 having sleeves 9 which fit around a longitudinally-extending rod 10 supported by the brackets 31 and located in the trench below the covers. By this arrangement, the covers 6 are pivotally mounted on the rod 10.

As is seen in FIG. 2, each cover has a top closure plate or panel 29 which fits obliquely over the open top of the container 7 and makes an acute angle with one of the side walls of the container 7. The cover is held in its closed position as shown in FIG. 2, in which the panel or plate 29 fits over and closes the top of the container 7, by latching means which includes a catch 11 which can be rotated about a pivot 12. The catch is provided with a hook portion 13 for engagement with a pin 14 provided on and projecting from the arm 8. The hooked end portion of the catch enters through an opening 32 in one of the side walls of the container 7 to position it in the path of travel of the net 3 when the net is elevated to an erect position by the raising of the masts 1 and 2. The catch, which is of bell-crank shape, has one of its arms constituting a balancing weight 15 and the catch is held in engagement with the pin 14 by a compression spring 16.

When an aircraft is to be arrested, the masts 1 and 2 are raised to the erect position. When this is done, the end sections of the net are lifted initially and the upper rope or cable 17, located below the catch 11 will, on its upward movement, engage under the catch 11 as shown in FIG. 3 and pivotally move it in a manner to disengage it from the pin 14. During this disengaging movement of the catch, the spring 16 will be compressed but it re-expands when the attachment joint 18 for the spring has been rotated to the other side of the dead center line between the pivot 12 and the other attachment joint 19 of the spring. Upon its re-expansion as above described the spring will act to rotate the catch in a manner to swing it out of the path of the elevating net, substantially as shown in FIG. 4.

When the catch becomes disengaged from the pin 14, the cover is released and it is pushed aside or rotatively moved by the upper rope or cable 17 of the net substantially as shown in FIG. 3, until under its own weight and with the aid of a spring 20, the cover swings over toward the side wall 35 of the trench, thus uncovering the top opening of the container 7 so that the net can be pulled upwardly to its erected position without obstruction. The spring 20 is attached at one end to an arm 32 projecting from the bracket 31, and has its other end attached to the arm 8.

By the described construction, the uncovering of the top of the container 7 takes place with successive cover movement with the lifting of the net out of the container in the trench. As shown in FIG. 4, the lower rope or cable 21 of the net can remain in the container 7 until the contact of the moving aircraft with the net will move said cable or rope accordingly.

The arrangement disclosed enables the net to be housed and protected from the elements while it is not in use, yet it permits the net to be erected very rapidly and reliably from its storage position in the trench, and such speed of net-erection is very important in connection with rapidly-approaching aircraft.

After the net has been used for the halting of an aircraft it can be manually replaced in the trench. There is no particular disadvantage in doing this replacement manually since while haste is desirable for the speedy erection of the net, it is not necessary for the hasty replacement of it in the trench.

Instead of securing the successive opening of the several covers by means of the elevating movement of the net, the arms 8, instead of pivotally moving around a stationary rod or shaft 10, can be fixedly mounted on such a rod or shaft and the rod or shaft caused to be rotated either manually or by the use of a motor. In such case, the covers can be made fewer in number and they will be moved unitarily and simultaneously by the rotation of the rod or shaft. The catches might be coupled together and the same can, if desired, be disengaged by the use of magnets.

In a simple form, the covers can be so constructed that they will remain in closed position by their own weight. In such a case their rotation beyond dead center will cause them to rotate to the open position under their own weight.

The bottom of the container 7 can be perforated or foraminous and located in a raised position above the bottom of the trench in order to permit the drainage of water out of the container. The trench can be also provided with drainage means and it can be heated in winter.

Having thus described a single embodiment of the invention, it is obvious that the same is not to be restricted thereto, but is broad enough to cover all structures coming within the scope of the annexed claims.

What we claim is:

1. A storage means for aircraft-arresting nets comprising, means attached to the net for elevating the same to an erected position, a trench located below the net and having a top opening, a plurality of successively-arranged cover members swingable to close the top of the trench when the net is situated within the trench, the cover members having centers of rotation located in the trench below its top opening, whereby the covers will be pushed aside with an arcuate sliding movement by the net when the net is lifted out of the trench.

2. A storage means as provided for in claim 1, wherein the cover members are connected to centers of rotation consisting of rods extending along in the trench, the connection being established by means of arms which are so arranged relative to the trench that when the net is erected the covers are opened successively with an arcuate sliding movement by the contact of the net with the arms to press them aside.

3. A storage means as provided for in claim 2, wherein the covers are locked in a closed position, and releasable catches for holding the cover members closed, said catches being equipped with hooks and being rotatably movable from closed to open position, the catches being so located over the collapsed net that they are released successively from the cover members by the net pressing the catches aside.

4. A storage means as provided for in claim 3, wherein the cover members or catches are balanced by means of counter-balancing means.

5. A storage means for an aircraft-arresting net comprising, a net, means at the opposite ends of the net for elevating the net to an erected position, a trench below the net into which the net is placed when the net is in a collapsed condition, the trench being open at the top, a plurality of successively-arranged pivotal covers fitting over the open top of the trench and closing the same, means for pivotally mounting the covers, latch means for engaging the covers and holding the same in closed position over the top of the trench, the latch means being in the path of movement of parts of the net in the travel of the net to erected position whereby the latch means will be disengaged from the covers by contact of parts of the net with such latch means during the raising movement of the net and the net will then pivotally and successively swing the covers to open position by its contact with the covers as it is moved to erected position by said net-elevating means.

6. A storage means as provided for in claim 5, wherein the trench contains a holder for the reception of the collapsed net, the covers being swingable to close the top of the container, the covers being provided with arms, a rod on which the arms are pivoted, the latch means including hooked, pivoted catches, the arms having projecting pins engaged by the catches, the catches having end portions protruding into the interior of the container and located in the path of movement of the net as the same is being elevated by the net-elevating means.

References Cited by the Examiner
UNITED STATES PATENTS

| | | | |
|---|---|---|---|
| 3,058,703 | 10/62 | Fonden et al. | 244—110 |
| 3,126,051 | 3/64 | Sussin | 160—40 |

MILTON BUCHLER, *Primary Examiner.*

FERGUS S. MIDDLETON, *Examiner.*